July 27, 1971  J. R. LEWIS ET AL  3,595,701

STORAGE BATTERY CONNECTOR

Filed Aug. 20, 1969

INVENTORS.
JACK R. LEWIS
JOHN H. DARE
BY

ATTORNEY.

United States Patent Office 3,595,701
Patented July 27, 1971

---

3,595,701
STORAGE BATTERY CONNECTOR
Jack R. Lewis and John H. Dare, Norristown, Pa., assignors to Keystone Cable Corporation, Philadelphia, Pa.
Filed Aug. 20, 1969, Ser. No. 851,585
Int. Cl. H01m 5/00
U.S. Cl. 136—135R    3 Claims

ABSTRACT OF THE DISCLOSURE

A storage battery connector is provided having a body section with a tapered post, a polygonal central section for wrench engagement and a stud having an exposed threaded end and a concealed head which strengthens the body section.

BACKGROUND OF THE INVENTION

Field of the invention

This invention relates to an electric storage battery connector and more particularly to a connector for the connection of one type of electric storage battery cable connector to a storage battery requiring a different character of connector.

Description of the prior art

The almost universally employed type of storage battery terminals are of frusto-conical shape, may be of different diameter for the positive and negative terminals, and the cables for connection to the terminals are customarily provided with clamps having openings which are complemental to terminals, and many millions of said cables and clamps are now in use on automotive vehicles and in marine service.

It is now proposed to supply a new design of storage battery having threaded holes for connection of the cables. These new batteries while suited for installations designed specifically for these connections cannot readily be used with present storage battery powered electrical systems.

SUMMARY OF THE INVENTION

In accordance with the present invention an electric storage battery connector is provided, suitable for use with batteries having threaded holes for cable connection, whereby said storage batteries can be readily connected into electrical systems now in use.

It is the principal object of the present invention, therefore, to provide an electric storage battery connector which serves as an adapter for clamp type cable connections and batteries having threaded holes for the terminals.

It is a further object of the present invention to provide an electric storage battery connector which is strong, sturdy and simple in construction.

It is a further object of the present invention to provide an electric storage battery connector by which two sizes will accommodate a large number of electrical systems now in use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
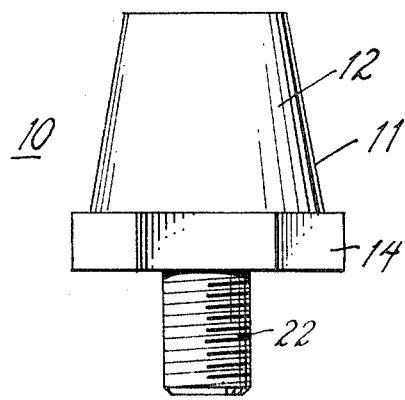
FIG. 1 is a side elevational view of an electric storage battery connector in accordance with the invention.
Figure 2:
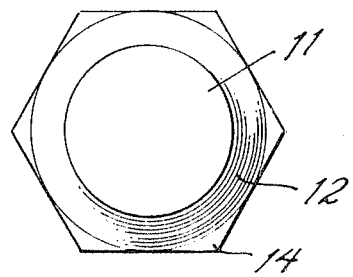
FIG. 2 is a top plan view of the connector shown in FIG. 1.
Figure 3:
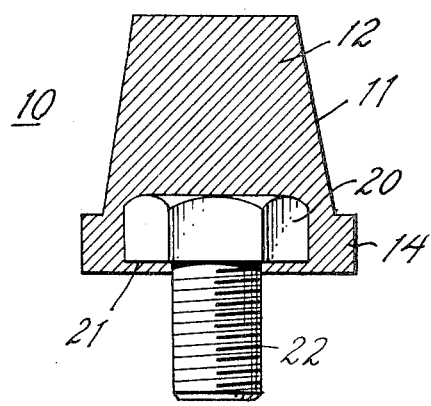
FIG. 3 is a central sectional view, taken approximately on the line 3—3 of FIG. 2.
Figure 4:
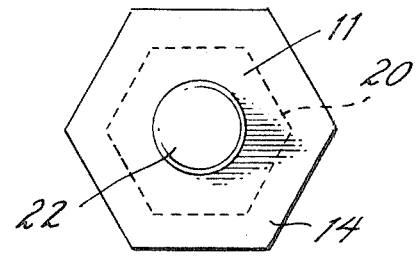
FIG. 4 is a bottom plan view of the connector shown in FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings the storage battery connector of the present invention is shown at 10 and includes a body portion 11.

The body portion 11 is preferably of lead, cast to shape and includes a frusto-conical portion 12 which for negative polarity connections may have the standard S.A.E. taper for negative battery terminals and for positive polarity connections may have the standard S.A.E. taper for positive battery terminals.

The frusto-conical portion 12 preferably has integral therewith a polygonal rim 14 disposed at the central region of the connector 10. The rim 14 may be of any desired shape but is preferably hexagonal and in a preferred embodiment will be $1\tfrac{3}{16}$ inch to accommodate a $1\tfrac{3}{16}$ inch hexagonal socket wrench.

The body portion 11 has embedded therein the head 20 of a stud 21, the head 20 being interiorly of the rim 14 and the contiguous part of frustoconical portion 12 and the threaded end 22 being exteriorly disposed. The stud 21 is coaxial with the portion 12.

The stud 21 can be of any desired material such as steel, brass, copper or aluminum alloy.

The stud 21 for a particular embodiment, and for a negative connector, can be $\tfrac{5}{16}$ inch stud with a hexagonal head 20 with 18 threads per inch and with about one half inch of the threaded end 22 exposed.

The stud 21 for another particular and related embodiment, and for a positive connector can be a $\tfrac{3}{8}$ inch stud with a hexagonal head 20, with 16 threads per inch and with about one half inch of the threaded end 22 exposed.

In use the threaded end 22 of proper size is energized in the battery opening turned by the application of a wrench on the rim 14 to the desired position. The head 20 of the stud 21 strengthens the rim 14 and contiguous parts of the body 11 and reduces the tendency of the soft metal of the body to distort or break upon the application of turning force on the rim 14.

The battery cable clamp (not shown) can then be applied on the tapered body portion 12 and tightened.

It will thus be seen that a simple, time saving and effective battery connector has been provided with which the objects of the invention are attained.

We claim:

1. An electric storage battery connector having
   a body portion,
   said body portion having an exteriorly frustoconical tapered end decreasing in diamenter toward its outer extremity and a central rim, and an oppositely extending threaded end coaxial with said tapered end, said threaded end being a portion of a stud the head of which is interiorly disposed in said body portion.

2. An electric storage battery connector as defined in claim 1 in which said rim is hexagonal, the head of the stud is hexagonal and the stud head is interiorly disposed in said body portion.

3. An electric storage battery connector as defined in claim 1 in which said body portion is of lead, and said stud is of a harder metal.

References Cited

UNITED STATES PATENTS

| D. 203,412 | 1/1966 | Wing | 85—9 |
| 1,303,311 | 5/1919 | Hazelett | 339—232 |
| 1,338,130 | 4/1920 | Hazelett | 339—232 |
| 3,176,808 | 4/1965 | Matthews | 189—36 |

IAN A. CALVERT, Primary Examiner

J. H. MCGLYNN, Assistant Examiner

U.S. Cl. X.R.

339—278R